United States Patent
Kahnert

(10) Patent No.: US 11,787,479 B2
(45) Date of Patent: Oct. 17, 2023

(54) TRACTOR WITH WHEEL HOUSING

(71) Applicant: DEERE & COMPANY, Moline, IL (US)

(72) Inventor: Thomas Kahnert, Schriesheim (DE)

(73) Assignee: DEERE & COMPANY, Moline, IL (US)

( * ) Notice: Subject to any disclaimer, the term of this patent is extended or adjusted under 35 U.S.C. 154(b) by 686 days.

(21) Appl. No.: 16/946,656

(22) Filed: Jun. 30, 2020

(65) Prior Publication Data

US 2021/0009207 A1  Jan. 14, 2021

(30) Foreign Application Priority Data

Jul. 12, 2019 (DE) .......................... 102019210327.8

(51) Int. Cl.
| | | |
|---|---|---|
| *B62D 25/16* | (2006.01) | |
| *A01B 51/02* | (2006.01) | |
| *B62D 49/06* | (2006.01) | |

(52) U.S. Cl.
CPC ............ *B62D 25/16* (2013.01); *A01B 51/026* (2013.01); *B62D 49/06* (2013.01)

(58) Field of Classification Search
CPC ........ B62D 25/16; B62D 49/06; A01B 51/026
USPC ....................................................... 180/89.1
See application file for complete search history.

(56) References Cited

U.S. PATENT DOCUMENTS

| | | | | |
|---|---|---|---|---|
| 5,184,832 | A * | 2/1993 | Miwa .................... | B62D 35/007 296/180.1 |
| 8,979,102 | B1 * | 3/2015 | Prentice ............... | B62D 25/186 280/124.1 |
| 10,494,033 | B2 * | 12/2019 | Haeseker ............. | B62D 25/186 |
| 2017/0217473 | A1 * | 8/2017 | Higashiguchi ......... | B60K 37/06 |
| 2017/0334486 | A1 * | 11/2017 | Plebani ................ | B62D 25/168 |
| 2018/0257716 | A1 * | 9/2018 | Haeseker ............. | B62D 35/008 |
| 2019/0126991 | A1 * | 5/2019 | Wymore ................ | B62D 25/16 |

FOREIGN PATENT DOCUMENTS

| | | |
|---|---|---|
| EP | 0672577 A2 | 9/1995 |
| EP | 1288114 A2 | 3/2003 |
| JP | 2010264927 A | 11/2010 |

OTHER PUBLICATIONS

European Search Report issued in counterpart application No. 20183252.4 dated Nov. 11, 2020 (10 pages).

* cited by examiner

*Primary Examiner* — James A Shriver, II
*Assistant Examiner* — Hilary L Johns

(57) ABSTRACT

A tractor includes a supporting structure, a cab coupled to the supporting structure, and a rear axle oriented in a transverse direction and being mounted to the supporting structure. A first portion of the tractor on a cab side and a second portion of the tractor on a supporting structure side proximate to the rear axle delimits a wheel housing for a rear wheel. The wheel housing includes a gap at least partially covered by a cover at least in the transverse direction.

19 Claims, 4 Drawing Sheets

TRACTOR WITH WHEEL HOUSING

RELATED APPLICATIONS

This application claims priority to German Patent Application Ser. No. 102019210327.8, filed Jul. 12, 2019, the disclosure of which is hereby incorporated by reference in its entirety.

FIELD OF THE DISCLOSURE

The present disclosure relates to a tractor, and in particular to a tractor with a wheel housing in a region of a rear axle of the tractor running in a transverse direction.

BACKGROUND

In the case of tractors, in particular in the region of a rear axle and wheel housings thereof, the problem arises that dirt, soil and the like collects therein in not insignificant amounts due to different working operations and weather conditions. This requires corresponding cleaning operations on the tractor. There is a need to reduce the aforementioned cleaning operations by a simple technical manner.

SUMMARY

According to the present disclosure, the tractor has a cab for the driver and a supporting structure. A rear axle running in a transverse direction of the tractor is mounted on the supporting structure. A portion of the tractor on the cab side and a portion of the tractor on the supporting structure side in the region of the rear axle delimit a so-called wheel housing which receives with a spacing a rear wheel of the rear axle. The delimiting surfaces of the wheel housing provide a splash guard relative to the cab and further components of the tractor and also relative to the surroundings. On the individual delimiting surfaces the wheel housing has at least one gap which forms a through-passage, cavity, free space, receiving space, or the like on the tractor. This gap is effectively covered by means of a cover, at least in the transverse direction.

The cover may also be effective in further spatial directions of the tractor, in particular in a longitudinal direction running parallel to the direction of travel of the tractor. In other words, in particular, the cover may also effectively cover a gap of the wheel housing in the longitudinal direction.

Thus, the cover prevents the undesired collection of dirt, mud, soil and the like in the region of the gap. Functional parts of the tractor (for example, electrical/electronic components, valves, cables) which are accessible in the region of the gap in the transverse direction, therefore, remain protected against the collection of dirt in a cost-effective manner. This reduces the necessary maintenance and cleaning operations on the tractor. Moreover, the cover provides improved protection of the functional parts against any mechanical damage. Moreover, the cover also contributes to a reduced noise level in the cab.

A portion "on the cab side" is understood, in particular, as a portion of the cab itself or a portion of the tractor which is fixedly and optionally also releasably connected to the cab of the tractor. A portion "on the supporting structure side" is understood, in particular, as a portion of the supporting structure itself (for example, the chassis, frame) or a portion of the tractor which is fixedly and optionally also releasably connected to the supporting structure of the tractor.

The cover is releasably, i.e., removably, fastened to the tractor, so that if required the cover is replaceable in a user-friendly manner and functional parts in the region of the gap, for example, are also easily accessible in a user-friendly manner in the case of maintenance or repair. For example, latching, clamping or screw connections are used for the releasable fastening.

Depending on the embodiment of the cover itself and depending on the structural conditions in the region of the wheel housing, the cover may be advantageously fastened on the cab side or on the supporting structure side. As a result, user-friendly installation conditions may be considered for the cover. Moreover, undesired mechanical stresses of the cover may be avoided in the case of relative movements between the cab and the supporting structure.

Advantageously, the cover has a plurality of cover parts which are individually fastenable on the cab side or on the supporting structure side. This assists a flexible geometric adaptation of the cover even in the case of complicated installation conditions in the region of the wheel housing. In the case of any maintenance or repair of the cover only the relevant part itself has to be dismantled and handled, which saves time and resources. Moreover, the cover may also be adapted more easily to desired specific features for the use thereof, by individual cover parts being produced, for example, from different materials.

Relative to the material properties of the cover parts, it is advantageous if at least one cover part is configured in a resilient manner. As a result, maintenance and repair operations to the cover and in the region of the wheel housing may be carried out in a time-saving manner, by individual cover parts being able to remain in the fastened state, i.e., in the assembled state, and only temporarily bent back or bent away.

In one embodiment, a cover part fastened on the cab side and a cover part fastened on the supporting structure side correspond with one another such that they are arranged so as to overlap one another in a vertical direction of the tractor. As a result, an undesired collection of dirt and the like in the region of the wheel housing gap may be avoided even in the case of relative movements of the cab in the vertical direction in relation to the supporting structure. The overlap is dimensioned, in particular, such that the covering action of the cover is ensured, even in the case of a maximum possible lifting movement of the cab in the vertical direction relative to the supporting structure.

In a further embodiment, in the assembled state the cover or the individual cover parts is/are at least partially positively arranged on a component of the tractor on the cab side or on the supporting structure side. This positive arrangement permits a space-saving construction of the cover and in a user-friendly manner avoids any faulty positioning of the cover.

Further, a cover part bears a coupling element which corresponds to a counter coupling element, in the manner of a mechanical coupling which is effective in the longitudinal direction of the tractor. In this case, the counter coupling element is already fastened to the tractor in a fixed position, in particular on the supporting structure side or on a further cover part. The counter coupling element thus acts as an assembly aid for correct assembly and mechanically stable fastening of the cover part which bears the coupling element. Additional fastening means or devices (for example, a screw connection on the cab side or the supporting structure side) for the cover part bearing a coupling element may be reduced to a minimum due to the coupling.

The aforementioned mechanical coupling is, in particular, configured in the manner of a positive connection. For example, the counter coupling element is configured to be approximately rectangular in cross section and conically tapering toward the coupling element in the longitudinal direction of the tractor. The corresponding coupling element is thus geometrically configured as a negative relief portion, in the manner of a frame part conically widening in the longitudinal direction.

A mobility of the cover or individual cover parts is limited in the transverse direction of the tractor. This limitation to the movement contributes to the avoidance of the collection of dirt and the like between the cover and the region of the gap on the wheel housing. For implementing a mechanically stable limitation to the movement the tractor has, in particular, a limit element fastened on the supporting structure side with a limit stop oriented approximately perpendicular to the transverse direction of the tractor.

For an effective limitation to the movement, it is provided that the limit stop which is fixed to the supporting structure supports on two sides a limit plate which is oriented approximately perpendicular to the transverse direction of the tractor and which is fixedly and optionally releasably connected to at least one cover part. The immovable limit stop thus acts as a stable resistance against such movements of the limit plate and thus also of the respective cover part in the transverse direction which would exceed a defined path.

In another embodiment, the limit plate has a plate recess which runs approximately in the vertical direction of the tractor and which movably surrounds the limit element for a relative mobility between the limit plate and the limit element approximately in the vertical direction. As a result, a part of the cover fastened on the cab side may perform pivoting movements of the cab relative to the supporting structure without hindrance and damage.

Any collection of dirt and the like in the region of the aforementioned plate recess is cost-effectively prevented by the limit plate and, in particular, the plate recess thereof being effectively covered in the transverse direction by a cover plate. In this case the limit plate and the cover plate are releasably connected together and clampingly fix at least one cover part between one another in the manner of two clamping jaws. As a result, a mechanically stable connection is also assisted between the respective cover part and the assigned limit plate.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawing, wherein.

Corresponding reference numerals are used to indicate corresponding parts in the drawings.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
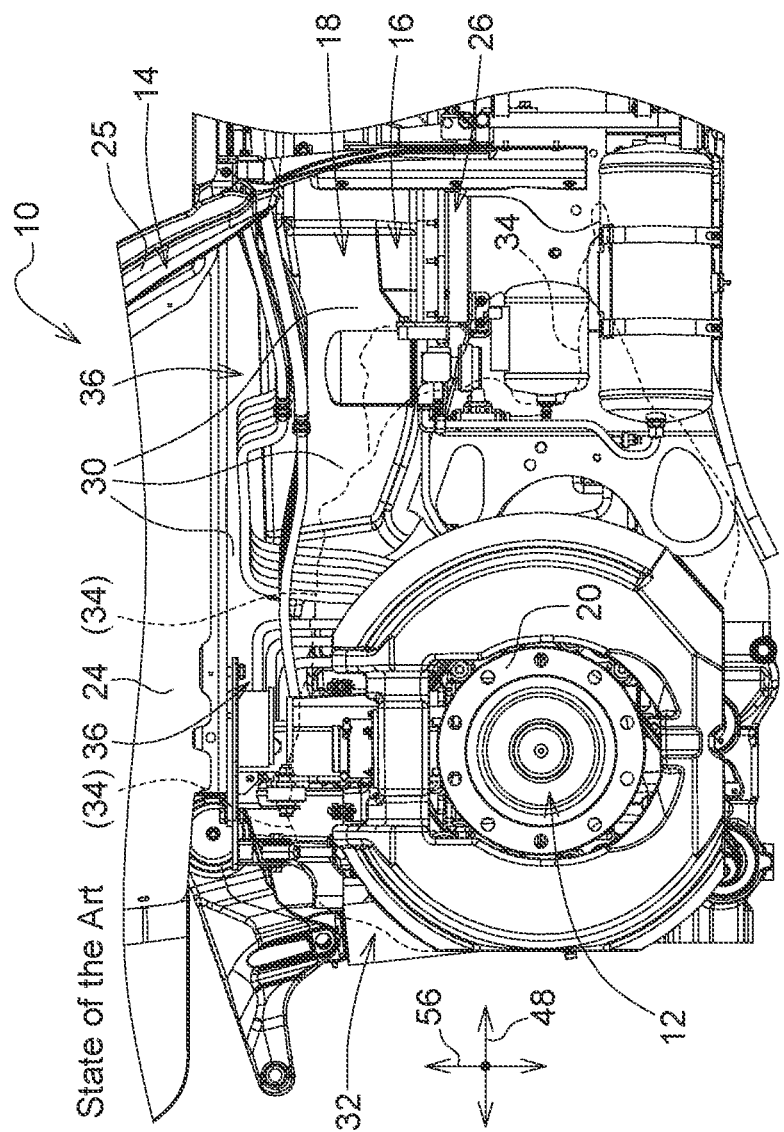
FIG. 1 shows a side view of a conventional wheel housing on the rear axle of a tractor with collections of dirt in the region of the wheel housing.

FIG. 1 shows a detail of a conventional tractor 10 in the region of its rear axle 12. A portion 14 of the tractor 10 on the cab side and a portion 16 of the tractor 10 on the supporting structure side in the region of the rear axle 12 delimit a wheel housing 18 for receiving a rear wheel, not shown here. The rear wheel is assembled via its rim in the conventional manner on a wheel flange 20 of the rear axle 12. The wheel housing 18 shown provides, in particular, a splash guard relative to a cab 22 of the tractor 10 and the surroundings, for example, even relative to people.

The cab 22 has, among other things, a side wall 24, a fender 25 or mud flap being connected thereto. The cab 22 is movably or immovably mounted on a supporting structure 26 of the tractor 10, in a manner not shown here in detail. Due to the structural design of the cab 22 and the supporting structure 26 in the region of the rear axle 12, the wheel housing 18 according to FIG. 1 has a gap 30 which is accessible in a transverse direction 28 of the tractor 10. Thus, in the region of this open gap 30 and adjoining regions (for example, of a rear power lift 32), a collection 34 of dirt, mud, soil and the like may be formed during the operation of the tractor 10. This requires corresponding cleaning operations, for example, on the rear power lift 32 and on components of the tractor 10 in the region of the gap 30, such as electrical or hydraulic cables 36 running therein.

Figure 2:
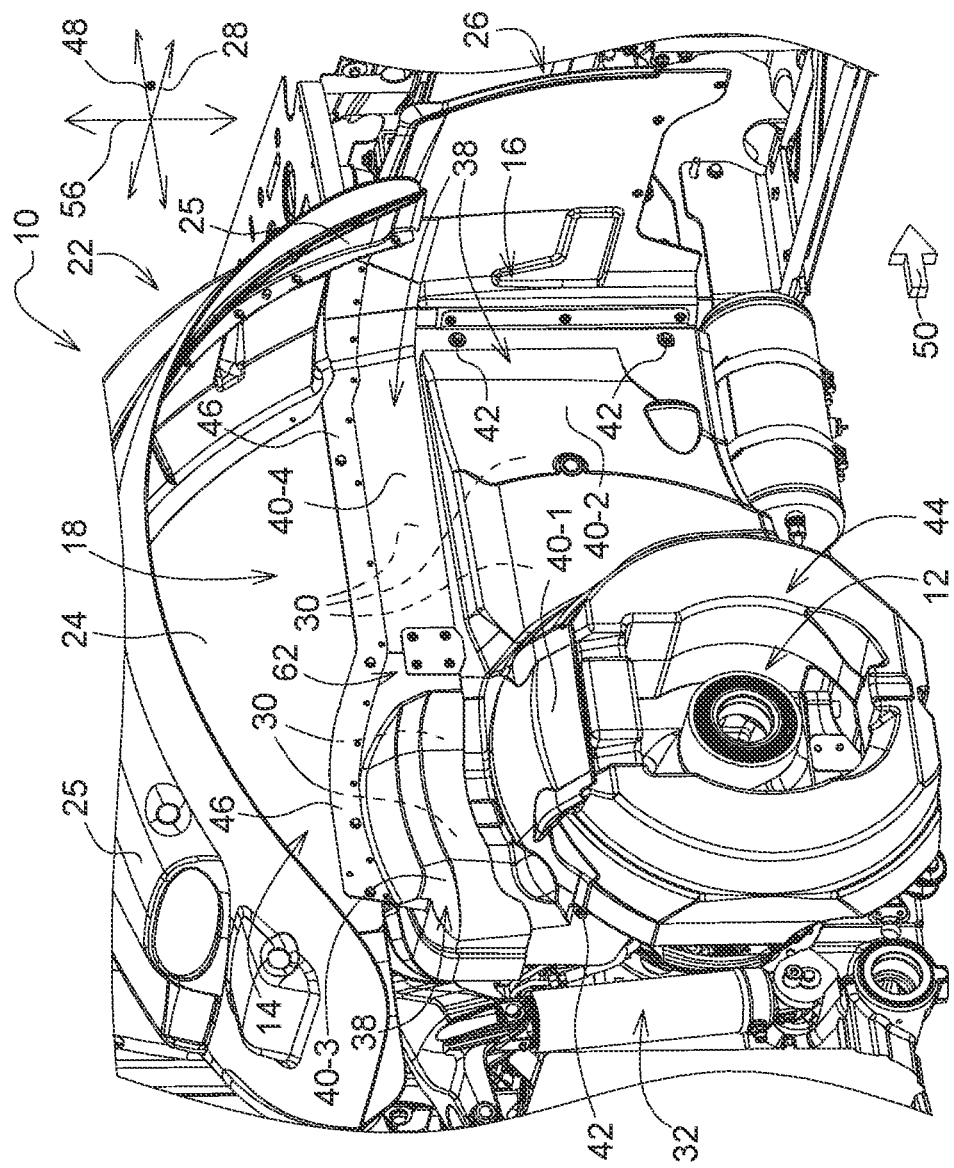
FIG. 2 shows a perspective view of the wheel housing of FIG. 1 with a cover according to the present disclosure.

In order to avoid or at least to reduce such cleaning operations, the gap 30 according to FIG. 2 is effectively covered by a cover 38 in the transverse direction 28. The cover 38 at least partially closes the gap 30. Accordingly, the gap 30 in the transverse direction 28 is not open at all or only partially open. In other words, a significantly reduced collection 34 of dirt, or no collection of dirt, and the like may enter the gap 30 in the transverse direction 28.

The cover 38 is releasably fastened, on the one hand, partially on the cab side and, on the other hand, partially on the supporting structure side. In this case, the cover 38 has a plurality of cover parts, for example, the cover parts 40-1, 40-2, 40-3, 40-4 according to FIG. 2.

The cover parts 40-1 and 40-2 are in each case releasably fastened on the supporting structure side by one or more fixing screws 42. The cover part is fastened by only one fixing screw 42, while the cover part 40-2 is fastened by the two visible fixing screws 42 and further fixing screws 42 which are covered in the view according to FIG. 2 by an oil tank 44 surrounding the rear axle 12. This oil tank 44 contains hydraulic oil for a rear axle transfer case.

The cover parts 40-3 and 40-4 are releasably or unreleasably fastened to one or more fixing strips 46, for example, by fixing screws 42. The fixing strip(s) 46 in turn is/are releasably or unreleasably fastened on the cab side, for example, also by fixing screws 42.

The wheel housing 18 assigned to the oil tank 44 is located to the right in the transverse direction 28, when the viewing direction corresponds to a forward direction of travel 50 oriented parallel to the longitudinal direction 48 of the tractor 10. The wheel housing 18 opposing the oil tank 44 in the transverse direction 28, is covered by a cover 38, which in contrast to the embodiment according to FIG. 2 has no cover part 40-2. This is because an outer wall 52 of a fuel tank 54 of the tractor 10 is arranged on the wheel housing 18 which is arranged to the left according to FIG. 3. In the case of the cover 38 according to FIG. 2, the cover part 40-2 replaces the outer wall 52 according to FIG. 3 to a certain extent.

The cover 38 in the assembled state is at least partially positively arranged on a portion 14 on the cab side or on a portion 16 on the supporting structure side. The positive connection assists a correct positioning of the cover 38 on the wheel housing 18 or on the gap 30 thereof. In this case, the cover part 40-1 bears positively against an outer surface of the oil tank 44 (FIG. 2). In the embodiment according to FIG. 3, the cover part 40-1 bears positively against an outer surface of the fuel tank 54.

The cover parts 40-3, 40-4 are produced from a resilient material (for example, rubber-like molded parts or material which is cut to length). The cover parts 40-1, 40-2 are produced from a malleable material (for example, plastics material). A resilient embodiment of the cover part 40-3 permits, if required, a simple dismantling of the cover part 40-1, by the resilient cover part 40-3 being bent away approximately in the transverse direction 28 so that the cover part 40-1 is released for dismantling in the longitudinal direction 48.

The cover part 40-3 fastened on the cab side and the cover part 40-1 fastened on the supporting structure side are arranged so as to overlap with one another in a movable manner in a vertical direction 56 of the tractor 10. As a result, the gap 30 remains closed even when, due to travel conditions, extreme relative movements occur between the cab 22 and the supporting structure 26 in the vertical direction 56. The vertical direction 56 is arranged approximately perpendicular to the transverse direction 28 and to the longitudinal direction 48.

Figure 4:
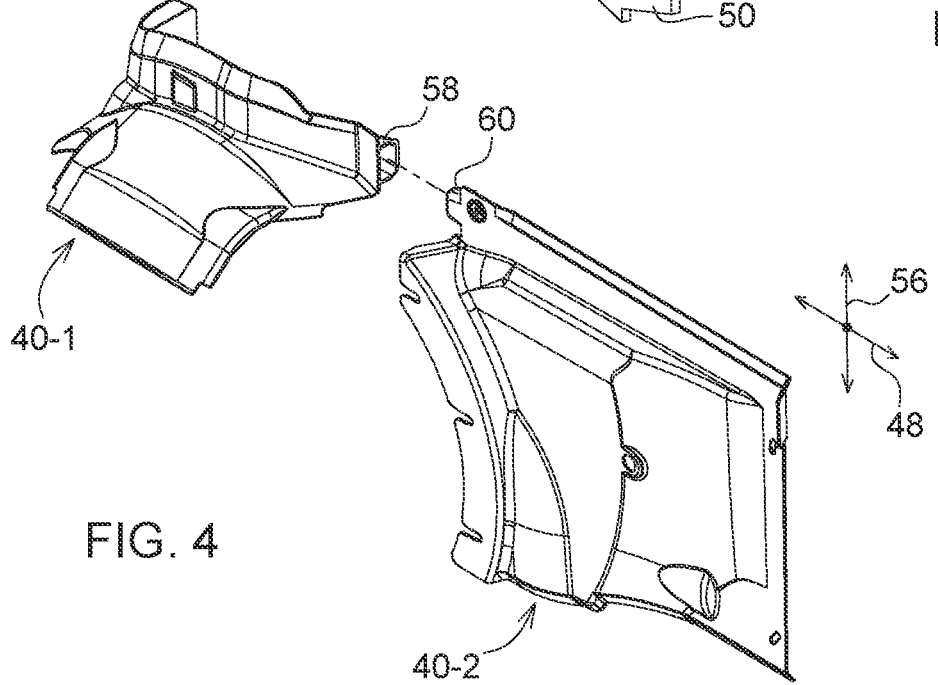
FIG. 4 shows a perspective exploded view of two individual cover parts of the cover according to FIG. 2.

In FIG. 4, it may be identified that the cover part 40-1 bears a coupling element 58. The coupling element 58 is configured in the manner of an approximately rectangular frame which widens conically toward the cover part 40-2 in the longitudinal direction 48. The coupling element 58 corresponds to a counter coupling element 60 in the manner of a mechanical coupling which is effective in the longitudinal direction 48. In the assembled state of the cover 38, the counter coupling element 60 engages approximately positively in the cavity of the frame-like coupling element 58.

To this end, the pin-like counter coupling element 60 is configured so as to taper conically toward the coupling element 58. The coupling serves as an assembly aid for the correct positioning of the cover part 40-1. To this end, the cover part 40-2 is initially fastened on the supporting structure side so that the counter coupling element 60 is immovably fixed to the tractor.

Figure 3:
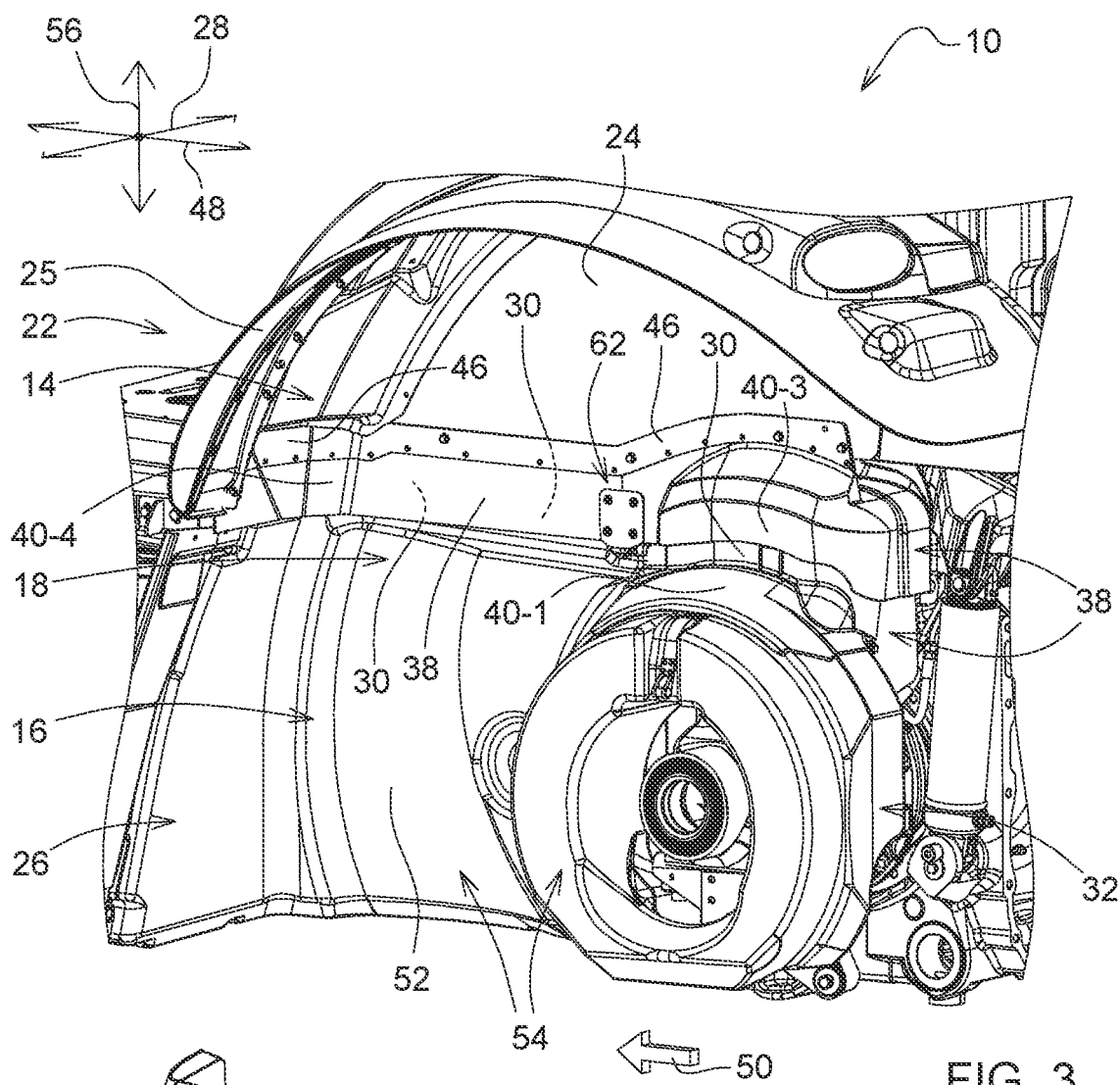
FIG. 3 shows a perspective view of a wheel housing opposing the wheel housing according to FIG. 2 in the transverse direction.

In the cover 38 according to FIG. 3, due to the cover part 40-2 not being present, the counter coupling element 60 is fastened to the supporting structure 26 itself, in particular fastened to the outer wall 52 and thus also fixed to the tractor 10. The cover part 40-1 with a coupling element 58 which is to be placed against an outer surface of the fuel tank 54 then expediently cooperates with this counter coupling element 60 during assembly, as described with reference to FIG. 4.

Figure 5:
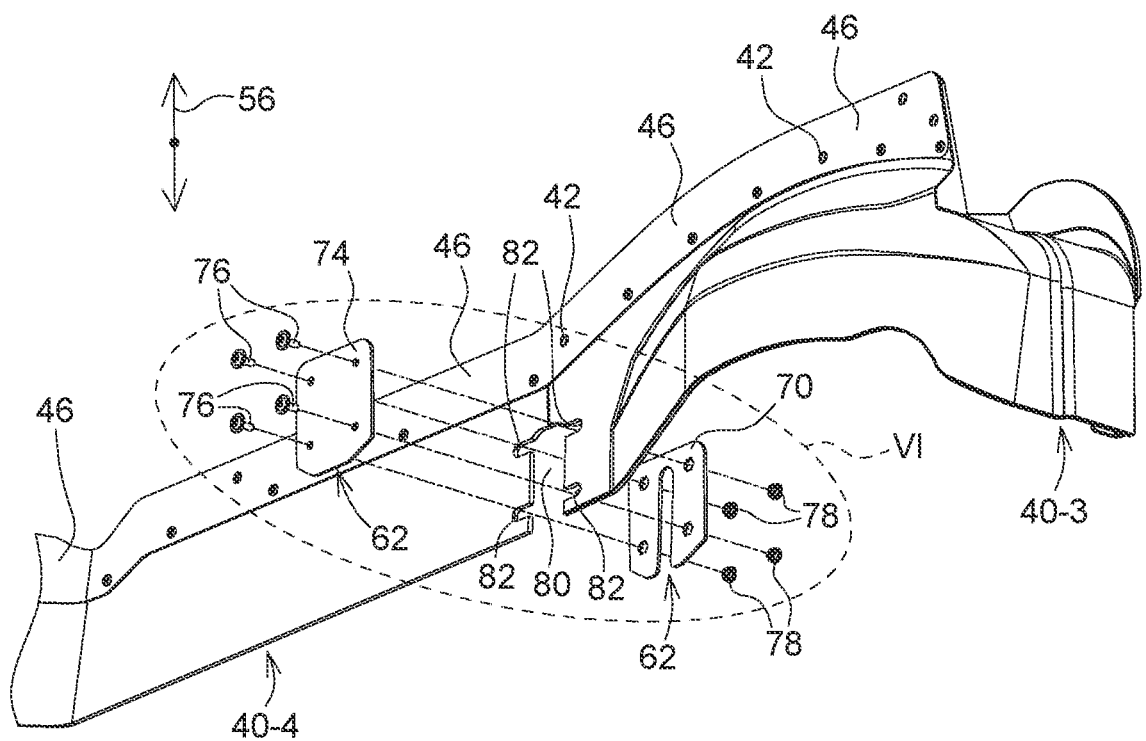
FIG. 5 shows a perspective view of a plurality of cover parts of the cover according to FIG. 3 and associated assembly parts in the region of the detail VI.
Figure 6:
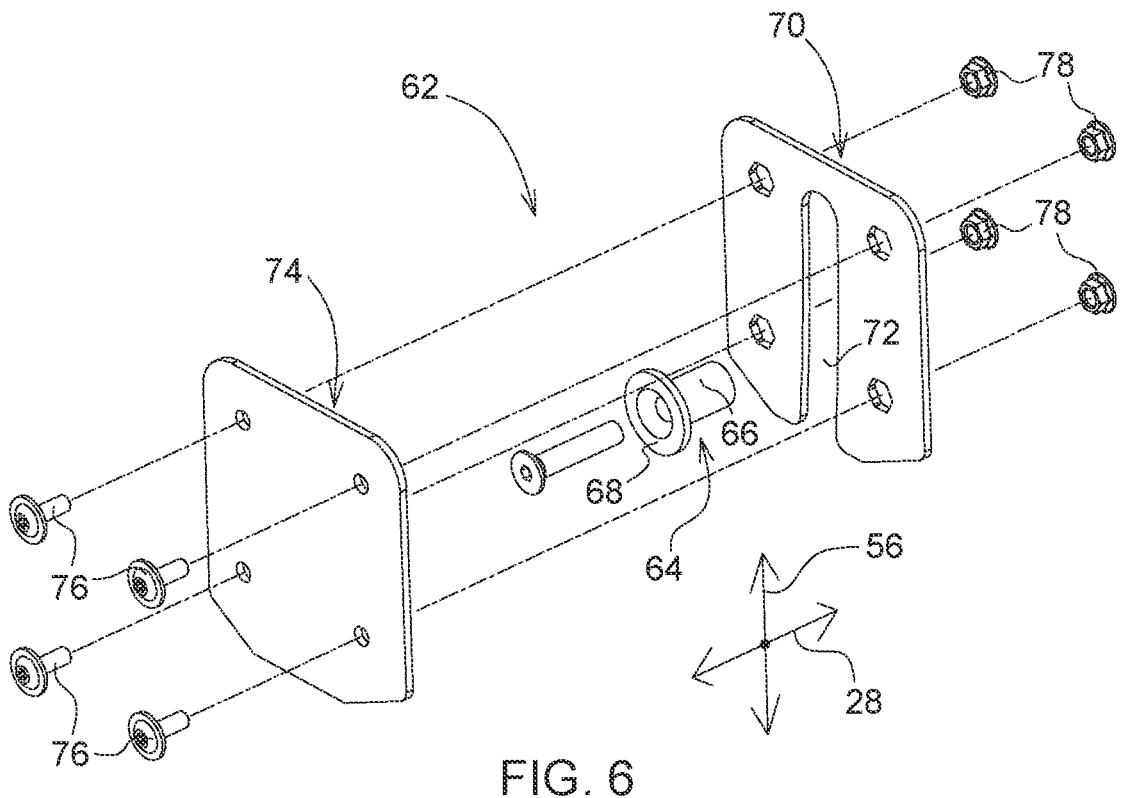
FIG. 6 shows an enlarged perspective view of the assembly parts of the detail VI according to FIG. 5.

FIG. 5 shows in the region of the detail VI a fixing device 62 in the dismantled state. The fixing device has, amongst other things, two plate-like components to be described below. The fixing device serves, on the one hand, for the guidance of the movement of the cover parts 40-3, 40-4 fastened on the cab side in the vertical direction 56 and, on the other hand, for limiting the movement of these cover parts 40-3, 40-4 in the transverse direction 28. The guidance of the movement in the vertical direction 56 avoids any damage to the cover 38 in the case of relative movements between the cab 22 and the supporting structure 26 in the vertical direction 56. The limitation to the movement in the transverse direction 28 delimits the spacing between the cover parts 40-1 and 40-3 in the transverse direction 28 so that no appreciable collection 34 of dirt and the like is able to enter the gap 30 via this spacing.

The fixing device 62 has a limit element 64 which is immovably fastened to the supporting structure 26 in the transverse direction 28. The limit element has a cylindrical portion 66 which extends in the transverse direction 28 and which at its free end bears a limit stop 68. The disk-shaped limit stop 68 is oriented approximately perpendicular to the transverse direction 28.

In the assembled state of the fixing device 62, a limit plate 70 is connected to the cover parts 40-3, 40-4 and oriented approximately perpendicular to the transverse direction 28. When these cover parts 40-3, 40-4 are moved in the transverse direction 28 the limit plate 70 is supported on two sides by the limit stop 68. The limit stop, as a result, limits the movements of the limit plate 70 and thus also of the cover parts 40-3, 40-4 in the transverse direction 28.

The limit plate 70 has a plate recess 72 which runs approximately in the vertical direction 56 and which movably surrounds the portion 66 of the limit element 64. As a result, in the assembled state of the cover 38, the guided mobility thereof is ensured when relative movements occur between the cab 22 and the supporting structure 26.

In the assembled state, the limit plate 70 is releasably connected to a plane-parallel cover plate 74. Four screws 76 and corresponding screw nuts 78 serve for this connection. The two plates 70, 74 thus act in the manner of two clamping jaws which clampingly fix the cover part 40-3 and the cover part 40-4 between one another in a releasable manner. This clamped fixing connects the cover parts 40-3, 40-4 to the limit plate 70 in the assembled state.

During the operation of the tractor 10, the cover plate 74 effectively covers the plate recess 72 in the transverse direction 28 so that in the region of the plate recess 72 a collection of dirt 34 and the like may not enter the gap 30. In the regions which adjoin one another the two cover parts 40-3 and 40-4 are penetrated by recesses 80, 82 (FIG. 5) in order to assist the above-described functionality of the fixing device 62. The slot-like recesses 82 permit an alignment of the cover parts 40-3 and 40-4 in the longitudinal direction 48 during assembly.

While embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:
1. A tractor, comprising:
a supporting structure;
a cab coupled to the supporting structure;
a rear axle oriented in a transverse direction and being mounted to the supporting structure;
wherein a first portion of the tractor on a cab side and a second portion of the tractor on a supporting structure side proximate to the rear axle delimits a wheel housing for a rear wheel;
wherein the wheel housing comprises a gap at least partially covered by a cover at least in the transverse direction, the cover comprises a plurality of cover parts including a first cover part fastened on the cab side and a second cover part fastened on the supporting structure side, and the first and second cover parts are arranged so as to overlap one another in a movable manner in a vertical direction.

2. The tractor as claimed in claim 1, wherein the cover is releasably fastened.

3. The tractor as claimed in claim 1, wherein the cover is fastened only on the cab side or on the supporting structure side.

4. The tractor as claimed in claim 1, wherein at least one the plurality of cover parts is formed of a resilient material.

5. The tractor as claimed in claim 1, wherein, in the assembled state the cover is at least partially positively arranged on a component of the tractor on the cab side or the supporting structure side.

6. The tractor as claimed in claim 5, wherein one of the plurality of cover parts is bearing a coupling element corresponding to a counter coupling element which is fixed to the tractor as a mechanical coupling in a longitudinal direction.

7. The tractor as claimed in claim 6, further comprising a limit element fastened on the supporting structure side and a limit stop oriented approximately perpendicular to the transverse direction of the tractor configured to limit movements of at least one of the plurality of the cover parts in the transverse direction.

8. The tractor as claimed in claim 7, wherein the limit stop supports on two sides a limit plate which is oriented approximately perpendicular to the transverse direction of the tractor and which is connected to at least one of the plurality of cover parts.

9. The tractor as claimed in claim 8, wherein the limit plate comprises a plate recess which runs approximately in the vertical direction of the tractor and which movably surrounds the limit element for a relative mobility approximately in the vertical direction.

10. The tractor as claimed in claim 8, wherein the limit plate and a cover plate are releasably connected together and clampingly fix at least one of the plurality of cover parts between one another in the manner of two clamping jaws.

11. a supporting structure;
A tractor, comprising:
a cab coupled to the supporting structure;
a rear axle oriented in a transverse direction and being mounted to the supporting structure;
structure;
a limit element fastened on the supporting structure side and a limit stop oriented approximately perpendicular to the transverse direction of the tractor;
wherein a first portion of the tractor on a cab side and a second portion of the tractor on a supporting structure side proximate to the rear axle delimits a wheel housing for a rear wheel;
wherein the wheel housing comprises a gap at least partially covered by a cover at least in the transverse direction;
further wherein the cover comprises a plurality of cover parts individually fastened on the cab side or the supporting structure side, where one of the plurality of cover parts includes a coupling element corresponding to a counter coupling element which is fixed to the tractor as a mechanical coupling in a longitudinal direction, and the limit stop is configured to limit movements of at least one of the plurality of cover parts in the transverse direction.

12. The tractor of claim 11, wherein the cover is releasably fastened.

13. The tractor of claim 11, wherein a first cover part of the plurality of cover parts fastened on the cab side and a second cover part of the plurality of cover parts fastened on the supporting structure side are arranged so as to overlap one another in a movable manner in a vertical direction.

14. The tractor of claim 11, wherein, in the assembled state the cover is at least partially positively arranged on a component of the tractor on the cab side or the supporting structure side.

15. The tractor of claim 11, wherein the limit stop supports on two sides a limit plate which is oriented approximately perpendicular to the transverse direction of the tractor and which is connected to at least one of the plurality of cover parts.

16. A tractor, comprising:
a supporting structure;
a cab coupled to the supporting structure;
a rear axle oriented in a transverse direction and being mounted to the supporting structure;
wherein, a first portion of the tractor on a cab side and a second portion of the tractor on a supporting structure side proximate to the rear axle delimits a wheel housing for a rear wheel;
wherein, the wheel housing comprises a gap at least partially covered by a cover at least in the transverse direction
wherein, the cover comprises a plurality of cover parts individually fastened on the cab side or the supporting structure side;
further wherein, a limit element is fastened on the supporting structure side and a limit stop is oriented approximately perpendicular to the transverse direction of the tractor for limiting movements of at least one of the plurality of cover parts in the transverse direction.

17. The tractor of claim 16, wherein:
the limit stop supports on two sides a limit plate which is oriented approximately perpendicular to the transverse direction of the tractor and which is connected to at least one of the plurality of cover parts;
the limit plate comprises a plate recess which runs approximately in the vertical direction of the tractor and which movably surrounds the limit element for a relative mobility approximately in the vertical direction.

18. The tractor of claim 15, wherein the limit plate comprises a plate recess which runs approximately in the vertical direction of the tractor and which movably surrounds the limit element for a relative mobility approximately in the vertical direction.

19. The tractor of claim 15, wherein the limit plate and a cover plate are releasably connected together and clampingly fix at least one of the plurality of cover parts between one another in the manner of two clamping jaws.

\* \* \* \* \*